United States Patent [19]

Shiota et al.

[11] Patent Number: 4,740,833
[45] Date of Patent: Apr. 26, 1988

[54] APPARATUS FOR PRODUCING A HARD COPY OF A COLOR PICTURE FROM A COLOR VIDEO SIGNAL PROCESSED IN ACCORDANCE WITH A SELECTED ONE OF A PLURALITY OF GROUPS OF COLOR CONVERSION COEFFICIENTS ASSOCIATED WITH DIFFERENT KINDS OF COLOR SEPARATING FILTERS

[75] Inventors: Kazuo Shiota; Hitoshi Urabe, both of Kaisei, Japan

[73] Assignee: Fuji Photo Film Co., Ltd., Kanagawa, Japan

[21] Appl. No.: 886,252

[22] Filed: Jul. 16, 1986

[30] Foreign Application Priority Data

Jul. 16, 1985 [JP]  Japan ................................ 60-155122

[51] Int. Cl.$^4$ ........................ G03F 3/08; H04N 1/46; H04N 11/20
[52] U.S. Cl. ........................................ 358/80; 358/11; 358/75; 358/909
[58] Field of Search .................... 358/80, 909, 11, 75, 358/75 IS, 76, 78

[56] References Cited

U.S. PATENT DOCUMENTS

| | | | |
|---|---|---|---|
| 3,875,587 | 4/1975 | Pugsley ................................ | 358/80 |
| 4,346,402 | 8/1982 | Pugsley ................................ | 358/80 |
| 4,394,688 | 7/1983 | Iida et al. ............................ | 358/164 |
| 4,458,265 | 7/1984 | Yoshida et al. ..................... | 358/78 |
| 4,485,413 | 11/1984 | Furuta et al. ........................ | 358/78 |
| 4,558,356 | 12/1985 | Toda et al. ........................... | 358/80 |
| 4,622,582 | 11/1986 | Yamada ................................ | 358/80 |
| 4,651,227 | 3/1987 | Yunoki et al. ...................... | 358/909 |

FOREIGN PATENT DOCUMENTS

| | | | |
|---|---|---|---|
| 220566 | 12/1983 | Japan ................................... | 358/80 |
| 2145598 | 3/1985 | United Kingdom ................. | 358/75 |

*Primary Examiner*—James J. Groody
*Assistant Examiner*—Randall S. Svihla
*Attorney, Agent, or Firm*—Birch, Stewart, Kolasch & Birch

[57] ABSTRACT

An apparatus for producing a hard copy of a picture picked up by a color image pickup device processes a video signal representing the picture according to data representing picture processing conditions entered by a data input unit. The data relates to the kind of a color separating filter associated with the image pickup device. A storage has groups of color conversion coefficients stored therein, each of which group specifies color conversion associated with the kind of a color separating filter, in accordance with the data relating to the kinds of color separating filters which are usable with image pickup devices. The picture represented by the processed video signal is recorded on a recording medium and displayed on a picture display. In response to the data received by the data input unit, a particular one of the groups of color conversion coefficients which is associated with the received data is read out of the storage, and the video signal is subjected to color correction according to the group of color conversion coefficients thus read out.

5 Claims, 7 Drawing Sheets

APPARATUS FOR PRODUCING A HARD COPY OF A COLOR PICTURE FROM A COLOR VIDEO SIGNAL PROCESSED IN ACCORDANCE WITH A SELECTED ONE OF A PLURALITY OF GROUPS OF COLOR CONVERSION COEFFICIENTS ASSOCIATED WITH DIFFERENT KINDS OF COLOR SEPARATING FILTERS

BACKGROUND OF THE INVENTION

1. Field of the Invention

The present invention relates to a picture recording apparatus and, more particularly, to an apparatus for producing a hard copy of a picture as represented by video signals which are formed by an electronic still camera, a television (TV) camera and other image pickup devices.

2. Description of the Prior Art

There is an increasing demand for an implementation to visualize various kinds of color video signals and produce hard copies of pictures which are represented by the video signals. In this connection, an achievement in the realm of imaging art is an electronic still camera which allows a hard copy of a picture to be produced easily and conveniently. Specifically, an electronic still camera uses a solid-state imaging device, an imaging tube or like image pickup device in combination with a recording device of the type using a magnetic disk which is an inexpensive and relatively large-capacity recording medium. The camera picks up an object purely electronically as a still picture and records video signals representative of the picture in the magnetic disk. The disk applicable to such a camera may be dimensioned as small as about 50 millimeters in diameter and rotated at a constant speed of 3,600 rotations per minute, so that video signals are recorded on a field basis or a frame basis in the disk.

An electronic still camera adapted for color image pickup generally includes a color separating filter which is located ahead of a photosensitive cell array of an imaging device of the camera. Light incident from an object to the filter is separated according to pixel-by-pixel separating colors, the resultant color components being incident to their associated photosensitive cells. Various kinds of color filters are extensively used. Predominant filters designed for a family of primary colors are those which separate incident light to a red (R), a green (G) and a blue (B) components while predominant filters designed for a family of complementary colors are those which separate a cyan (Cy), a magenta (M) and a yellow (Ye) components or a white (W) and the Ye, G and Cy components.

For the above reason, pictures picked up by a color electronic still camera are recorded in the form of video signals in various tones depending upon the kind of the camera used. Specifically, pictures reproduced from video signals recorded differ delicately from each other in color reproducibility depending upon the kind of a color separating filter.

For example, a color separating filter, or color filter, adapted for primary colors is excellent in color separation but short in brightness. Conversely, a color filter adapted for complementary colors is sufficient in brightness but short in sharpness. It follows that where video signals are reproduced by a playback apparatus from a magnetic disk in which pictures picked up through a complementary color filter are stored while maintaining in the playback apparatus image processing parameters suitable for the reproduction of video signals out of a magnetic disk in which pictures picked up through a primary color filter are stored, it is impossible to achieve adequate color reproducibility.

Therefore, in order that a picture may be reproduced as naturally to the eyes as an actual scene, it is necessary for the colors to be compensated or converted in compliance with, for example, the kind of a color filter which was used to pick up the picture. Such implies that where a picture represented by video signals is to be turned into a hard copy, i.e., print, it is the prerequisite to subject a video signal to color correction.

Color correction as mentioned above is indispensable not only to video signals recorded in a magnetic video disk, or so-called video floppy, by an electronic still camera but also to those video signals which are available from various kinds of sources, in the event of producing a hard copy from the video signals. Specific examples of the video signals other than those stored in a video disk are TV signals in an ordinary format, i.e., video signals generated by a TV camera with an imaging tube or a solid-state imaging device with or without the intermediary of a magnetic disk, a video tape and other recording media, and TV signals received from communication media such as broadcasting.

SUMMARY OF THE INVENTION

It is therefore an object of the present invention to provide an apparatus which is capable of producing a hard copy of a picture with good quality and, thereby, meeting the requirements as discussed above.

An apparatus for producing a hard copy of a picture of the present invention includes a first input device for inputting video signals representative of a picture which was picked up by a color image pickup device, and a second input device for inputting data of picture processing conditions which are to be applied to the video signals. A picture processor processes the video signals according to the picture processing condition data inputted. A picture recording device records in a recording medium a picture which is represented by the video signals while a picture display displays the picture for monitoring. The picture processing conditions include information relating to a kind of a color separating filter installed in the color image pickup device which was used to record the video signals. The picture processor subjects the video signals to color correction in response to the information which is entered through the second input device.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
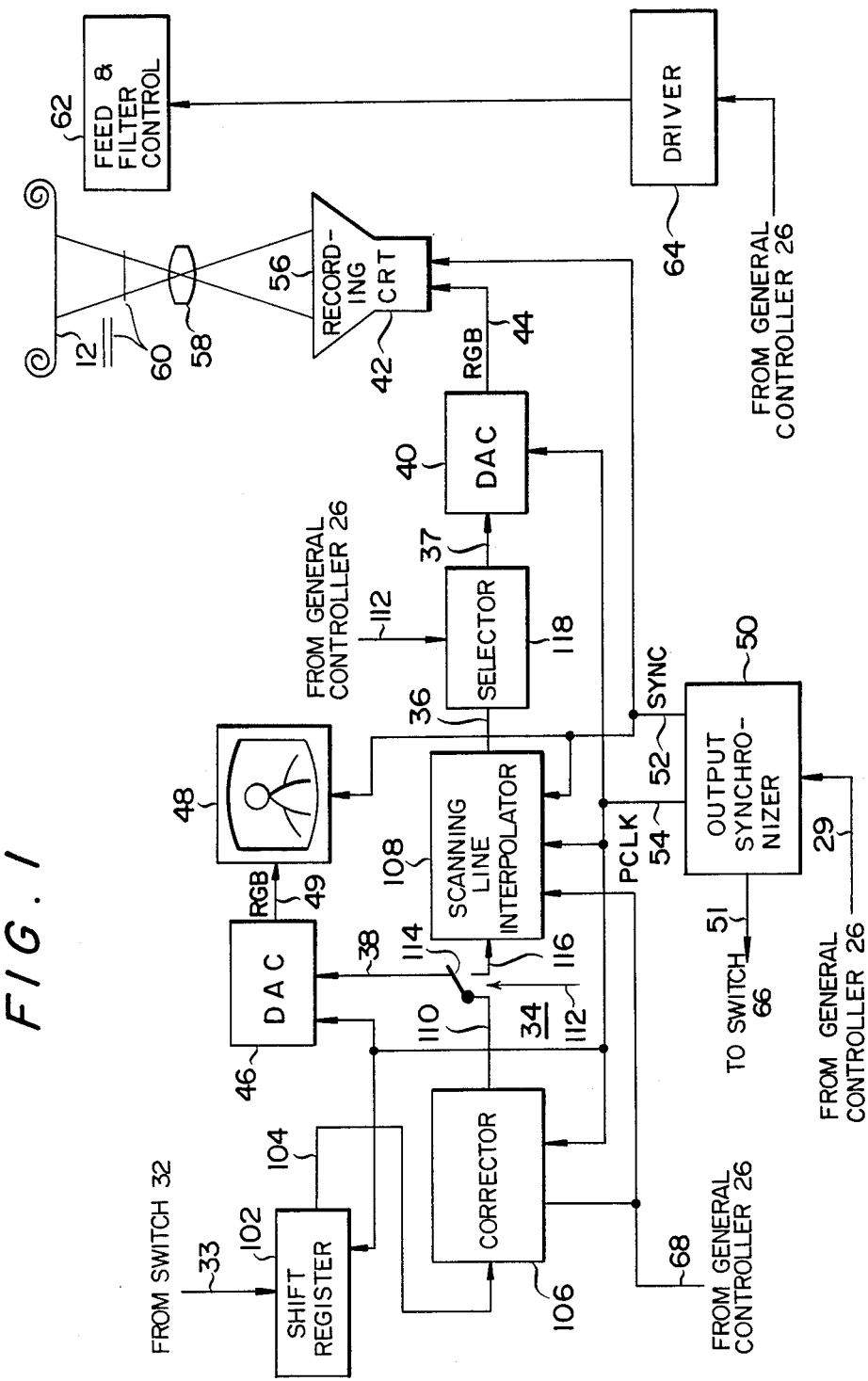
FIG. 1 is a schematic block diagram showing a part of a hard copy producing apparatus embodying the present invention.
Figure 2:
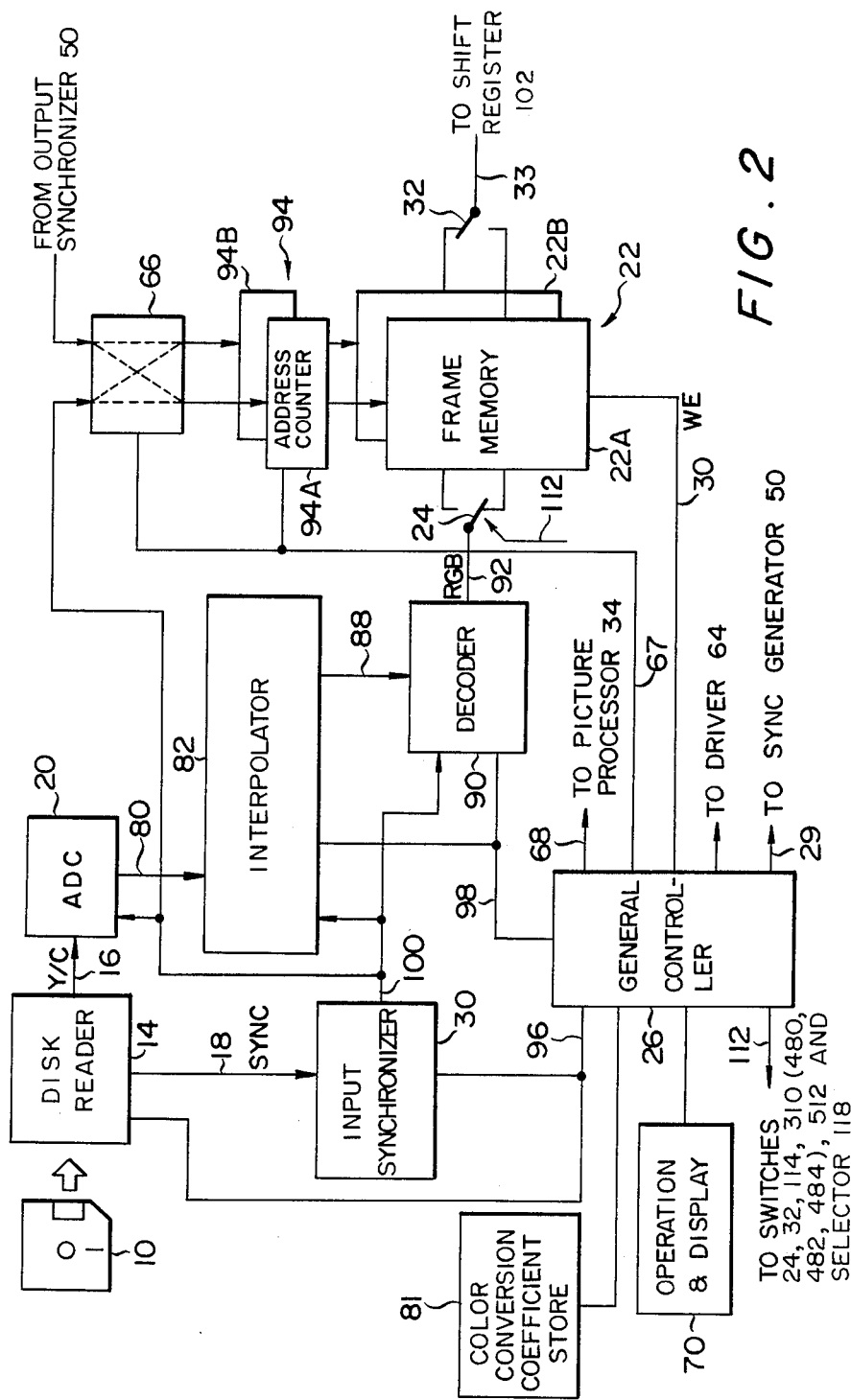
FIG. 2 is a view, similar to FIG. 1, showing the other part of the apparatus.

Referring to FIGS. 1-2 of the drawings, in accordance with a particular embodiment of the present invention, pictures picked up by an electronic still camera or the like are recorded in a magnetic disk for pictures, or video floppy, 10 in the form of field video signals or frame video signals, and selectively read out of the disk 10 to be reproduced in the form of hard copies on a picture recording medium 12.

A color electronic still camera, for example, generally includes a color separating filter which is located ahead of a photosensitive cell array of an imaging device of the camera. Light incident from an object to the filter is separated according to pixel-by-pixel separating colors, the resultant color components being incident to their associated photosensitive cells. Various kinds of color filters are extensively used. Predominant filters designed for a family of primary colors are those which separate incident light to a red (R), a green (G) and a blue (B) components while predominant filters designed for a family of complementary colors are those which separate a cyan (Cy), a magenta (M) and a yellow (Ye) components or a white (W) and the Ye, G and Cy components.

Video signals formed by the imaging device are read out, timed to a read clock, then subjected to gamma compensation, and then converted to luminance (Y) signals and chrominance (C) signals to be written into the disk 10. The video signals may be frequency-modulated in a form of line-sequential color-difference field video signals. In this particular embodiment, video signals are stored in the disk 10 one field per track. The video signals may either be so-called field video signals in which one field constitutes one frame, or so-called frame video signals in which a pair of fields constitute one frame. In the case where frame video signals are used, such is represented by a data signal which is superposed on the video signals. The data signal may advantageously be implemented with one which is superposed on video signals by a differential phase shift keying (DPSK) system.

The apparatus includes a magnetic disk reading section, or disk reader, 14 which serves as a device for inputting such video signals. The disk reader 14 reads video signals out of the disk 10, then demodulates them, then separates luminance (Y) signals and line-sequential color-difference signals (R-Y, B-Y) as well as synchronizing signals (SYNC) from the demodulated signals, and then feeds the signals Y and (R-Y, B-Y) to a line 16 and the signals SYNC to a line 18. The previously mentioned DPSK data is also read by the disk reader 14. Where a magnetic disk storing frame video signals is used, the DPSK data informs a general control section, or general controller, 26 of it via a control line 96. In this particular embodiment, the chrominance signals are implemented with a line-sequential color-difference signals. If desired, a magnetic tape reader, a receiver connected to a communication link and other video signal input units may be installed in place of or in addition to the disk reader 14.

The signals Y and C are applied over the line 16 to an analog-to-digital converter (ADC) 20 to be individually converted to digital data. The digital data are fed to an interpolating section 82, or interpolator, over a line 80. As described later in detail, the interpolator 82 functions to interpolate missing portions of the Y and C by performing mathematical operations. The output 88 of the interpolator 82 is routed to a decoding section, or decoder, 90.

The decoder 90 decodes the interpolated video signal to three separated-color signals, e.g., three primary color signals RGB which appear at an output 92 of the decoder 90.

The signals RGB are delivered from an output 92 to a frame memory 22 via a switch 24 to be written therein. The switch 24 is controlled by the general controller 26. As shown, the frame memory 22 is made up of two store units 22A and 22B so that the video signal data are selectively written into the store units 22A and 22B under the control of the switch 24.

In this particular embodiment, each of the frame memories 22A and 22B is implemented with a random access memory (RAM) having a capacity great enough to accommodate one frame of video signal data. The address of storage locations of frame memories 22A and 22B are controlled by an address counter 94. A memory control signal indicative of whether to write or to read data as well as others is fed from the general controller 26 to the frame memory 22 over a line 30.

The address counter 94 is made up of two units 94A and 94B which are associated with the memories 22A and 22B, respectively. An increment clock for incrementing the address counters 94 is supplied from an input synchronizing section, or input synchronizer, 30 during data writing and from an output synchronizing section, or output synchronizer, 50 during data reading, each via a switch circuit 66. The address counter 94 is incremented in one mode when data is written into the memory 22 and in another mode when it is read thereoutof, as described later in detail. The switching of the incrementing modes and that of the switch circuit 66 are controlled by the general controller 26 via a control line 67.

The synchronizing signals SYNC separated by the disk reader 14 are fed to the input synchronizer 30. The synchronizer 30 includes a phase-locked loop adapted to prepare various synchronizing signals such as a pixel clock PCLK, a horizontal synchronizing signal HSYNC and a vertical synchronizing signal VSYNC using the input signal SYNC, while producing them at an output 100 thereof. With such synchronizing signals, the synchronizer 30 functions to control synchronization of the reading system which reads video signals out of the disk 10. The pixel clock PCLK at the output 100 is routed to the interpolator 82 and the decoder 90 and, via the switch 66, to the address counter 94.

A switch 32 is controlled by the general controller 26 to selectively apply data read out of the frame memory 22, i.e., video signal data read out of the two units 22A and 22B to an input 33 of a shift register 102, FIG. 1. A picture processing section, or picture processor, 34 is the pivotal section of the apparatus of the present invention. The general controller 26 controls the disk reader 14 and input synchronizer 30 via the control line 96 and the interpolator 82 and decoder 90 via a control line 98.

As symbolically represented by a control line 112 in FIG. 2, the switches 24 and 32 are controlled by the general controller 26 such that, while one of them is connected to one of the memory units 22A or 22B, the other is always connected to the other memory unit. That is, the arrangement is such that while one of the memory units 22A and 22B is conditioned for data writing, the other is conditioned for data reading.

Referring to FIG. 1, video signal data read out in parallel out of the memory unit 22A or 22B are applied to the shift register 102 via the switch 32, as previously stated. The shift register 102 serves as a parallel-to-serial conversion circuit adapted to produce the input parallel video signal data sequentially at an output 104 thereof in response to the synchronizing signals SYNC, which are applied to the shift register 102 from the output synchronizer 50 via a control line 52. The output 104 of the shift register 102 is interconnected to the picture processor 34.

The picture processor 34 is made up of a correcting subsection, or corrector, 106 for performing various kinds of picture processing such as adjustment of color balance, white balance, tone and density of a reproduced picture and, in this particular embodiment, a scanning line interpolating subsection, or scanning line interpolator, 108 the operation of which will be described. The video signal data are subjected to the picture processing in response to a control signal which the general controller 26 supplies over a control input 68 after decoding a picture processing command, which is entered through an operation and display section 70.

Figure 3:
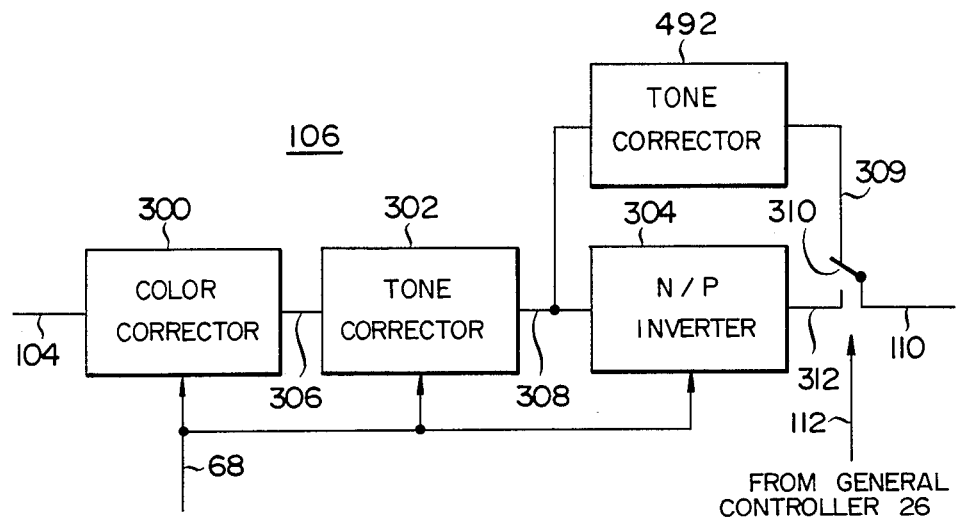
FIG. 3 is a block diagram showing a specific construction of a correcting section shown in FIG. 1.

Referring to FIG. 3, the corrector 106 comprises a color correcting subsection, or color corrector, 300, a tone correcting subsection, or tone corrector, 302, and a negative-to-positive (N/P) inverting subsection, or N/P inverter, 304. The color corrector 300 plays the role of a picture processing circuit which responsive to the output 104 of the shift register 102 corrects the color balance and white balance of a picture which is represented by the video signals. Conditions for the correction are set up from the general controller 26 via the control line 68 and may be varied frame by frame by manipulating the operation and display section 70.

The output 306 of the color corrector 300 is interconnected to the tone corrector 302 which serves as a picture processing circuit adapted to correct the density and tone of the picture as represented by the video signals. Again, conditions for the correction are set up from the general controller 26 via the control line 68 and may be varied frame by frame by manipulating the operation and display section 70.

The output 308 of the tone corrector 302 is interconnected to an output line 110 by way of a switch 310 and to the N/P inverter 304. The N/P inverter 304 is a picture processing circuit operative to invert the video signals applied to the input 308 to match them to particular negative photosensitivity and tone of a printing paper, which is applicable to the apparatus as the medium 12. Conditions concerned with such characteristics, too, are established by the general controller 26 via the control line 68 responsive to manipulation of the operation and display section 70.

The switch 310 is controlled by the general controller 26, as symbolically indicated by the control line 112 extending from the controller 26. While a picture is reproduced on a monitor 48, the switch 310 is positioned as illustrated so that video signals appearing on the output 308 of the color corrector 300 are directly routed to the output 110. While a picture is reproduced on a recording CRT 42, on the other hand, the switch 310 is actuated to a position opposite to the illustrated so as to feed the video signals from an output 312 of the N/P inverter 304 to the output 110.

The output 110 of the corrector 106 is interconnected to an input 116 of the scanning line interpolator 108 and an input 38 of a digital-to-analog converting section (DAC) 46 via a switch 114.

Figure 4:
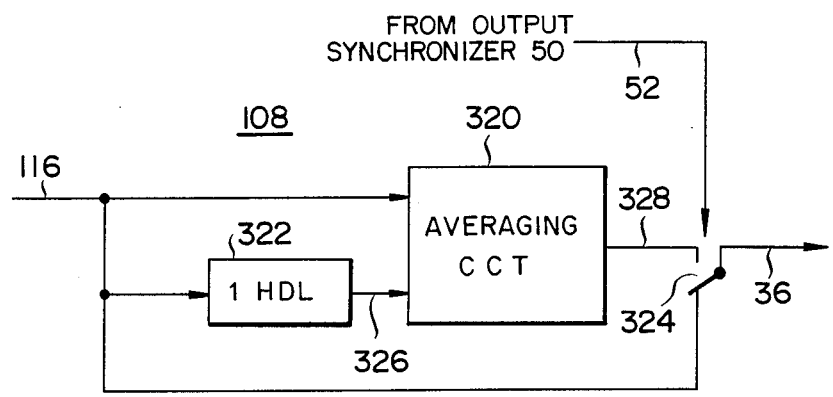
FIG. 4 is a block diagram showing a specific construction of a scanning line interpolating section also shown in FIG. 1.

As shown in FIG. 4, in the illustrative embodiment, the interpolator 108 comprises an averaging circuit 320 and a delay circuit (1HDL) 322. The input 116 is interconnected to the inputs of the two circuits 320 and 322 as well as to a switch 324. The output 326 of the delay circuit 322 is interconnected to the other input of the circuit 320. The delay circuit 322 sequentially receives video signals at the input 116 and sequentially produces them at the output 326 after delaying them by one horizontal scanning period (1H).

The averaging circuit 320 functions to simply add and average video signals which are sequentially applied thereto from the two inputs 116 and 326 and deviated by 1H from each other, on the basis of corresponding pixel positions. The output 328 of the circuit 320 is interconnected to an output line 36 via the switch 324. The switch 324 alternates its two different states timed to the horizontal synchronizing signals HSYNC which are supplied from the output synchronizer 50 over the line 52.

Figure 5:
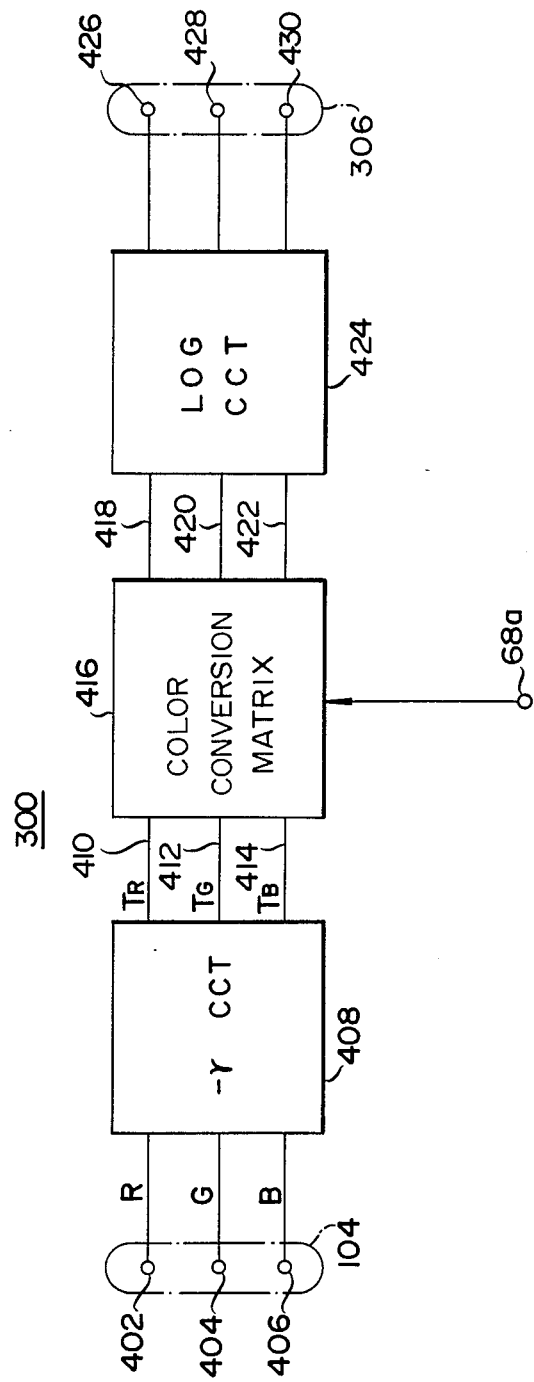
FIGS. 5 and 6 are block diagrams showing in detail a specific construction of a picture processing section included in the arrangement of FIG. 2.

Referring to FIG. 5, the color corrector 300 will be described in detail. As shown, the color corrector 300 includes a $-\gamma$ circuit 408 having three inputs 402, 404 and 406 which receive respectively the three separated-color video signals R, G and B from the output 104 of the shift register 102, i.e. data read out of the frame memory 22. The $-\gamma$ circuit 408 is adapted to cancel $\gamma$ compensation to which the video signals stored in the disk 10 were subjected in an electronic still camera or any other image pick-up device. The separated-color signals with gamma compensation cancelled as stated, i.e., true numbers TR, TG and TB, are fed to a color conversion matrix 416 via outputs 410, 412 and 414 of the circuit 408, respectively. Functioning to compensate for the influence of a particular characteristic of a color separating filter which is installed in a camera, the matrix 416 compensates video signal data using compensation coefficients which are selected and indicated in compliance with a kind of a filter. As for the compensation coefficients, as a compensation command entered through the operation and display section 70 is decoded by the general controller 26, the coefficients are delivered to a control input 68a as a control signal which is associated with the decoded command. The matrix 416 subjects the video signal data to color correction according to the compensation coefficients.

In this particular embodiment, such compensation coefficients are stored in a color conversion coefficient storing section 81, FIG. 2, which is interconnected to the general controller 26. Where the controller 26 is implemented with a microprocessor system as will be described, the storing section, or store, 81 may advantageously be embodied as a ROM, RAM or like memory of the microprocessor system.

From the standpoint of practical use, it is desirable to load the store 81 with different groups of coefficients each being assigned to a particular kind of color separating filter which may be used with any possible kind of image pick-up device adapted to record pictures in the disk 10, e.g. electronic still camera.

Figure 6:
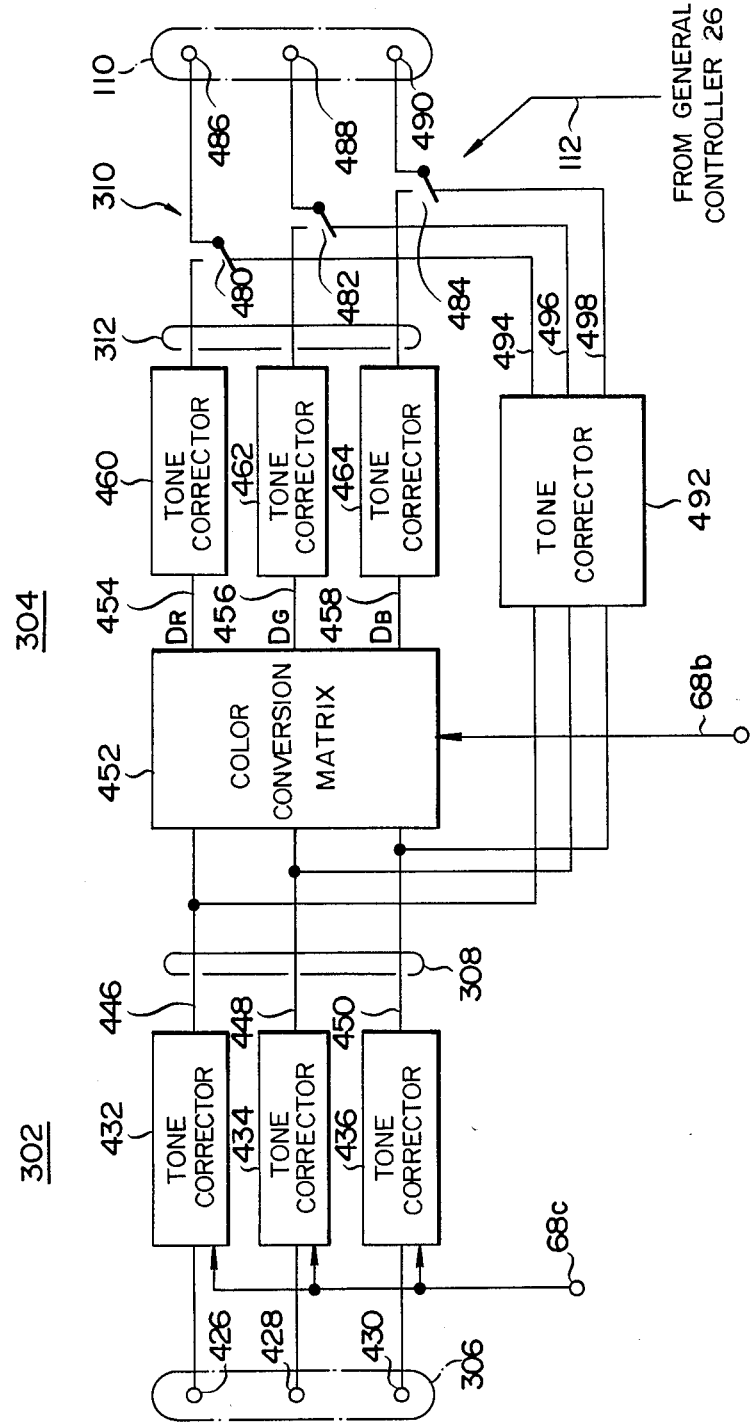

Returning to FIG. 5, the matrix 416 multiplies the separated color video signal data arriving at its inputs 410, 412 and 414 by a selected one group of compensation coefficients and produces the products at its outputs 418, 420 and 422, which are interconnected to a logarithm (LOG) circuit 424. The LOG circuit 424 logarithmically compresses the separated-color signals which have been compensated by the matrix 416. The compressed outputs 426, 428 and 430 of the LOG circuit 424 are respectively applied to their associated tone correction circuits, or tone correctors, 432, 434 and 436 as shown in FIG. 6.

Even where the distribution of respective separated-color components in a picture is rather uneven such as in a picture of a person shot with a wide snow scene for a background, the tone correctors 432, 434 and 436 successfully compensate the video signals so that the picture may appear as naturally as the actual scene picked up. The tone correctors 432, 434 and 436 may advantageously be implemented with ROMs in which compensation data are stored as lookup tables, for example. Which ones of the tone compensation data should be selected out of the lookup tables is instructed by the general controller 26 over a control line 68c. This instruction may be fed to the controller 26 through the operation and display section 70 for each frame of pictures which should be recorded or reproduced.

The outputs of the tone correctors 432, 434 and 436 are interconnected to another color conversion matrix 452 on one hand and to another tone corrector 492 on the other hand. The tone corrector 492 has three outputs 494, 496 and 498 which are respectively interconnected to output lines 486, 488 and 490 via switches 480, 482 and 484.

The matrix 452 serves to compensate for improper absorption which is associated with a particular coloring matter of the recording medium 12. Specifically, the matrix 452 has compensation coefficients for compensating for deviations of color sensitivity of the medium 12 from an ideal distribution curve and performs predetermined picture processing such as subjecting the video signals arrived at inputs 446, 448 and 450 to compensation by use of the coefficients. An arrangement may be made such that as a compensation command entered through the operating section 70 is decoded by the controller 26, coefficients associated with the command is delivered to a control input 68b as a control signal.

Three outputs DR, DG and DB of the matrix 452 having undergone the above compensation are interconnected to other tone correctors 460, 462 and 464, respectively. The tone correctors 460, 462 and 464 are each adapted to inverse-logarithmically convert, or logarithmically expand, the video signal data appearing at an input 454, 456 or 458 thereof so as to effect gamma compensation and compensation of characteristics inclusive of N/P conversion which are needed in relation to the medium 12. Such may advantageously be implemented with a ROM or like memory in which compensation data are stored in a lookup table. The tone correctors 460, 462 and 464 are respectively interconnected to the switches 480, 482 and 484 which in combination constitute the switch 310 of FIG. 3.

The tone corrector 492 inverse-logarithmically converts the video signal data arrived at the inputs 446, 448 and 450 to subject them to gamma compensation, so that a picture may be displayed on the monitor 48 as will be described. This tone corrector 492, like the others, may advantageously comprise ROMs and other memories each storing compensation data in a lookup table. The outputs 494, 496 and 498 of the circuit 492 are respectively connected to the outputs 486, 488 and 490 via the switches 480, 482 and 484.

Referring again to FIG. 1, one output 36 of the picture processing section 34 is routed through a selector 118 and a DAC 40 to a color signal input terminal 44 of the picture output unit for recording 42, e.g. CRT. The output 38 of the picture processor 34 is interconnected to a color signal input terminal 49 of the monitor 48 via the DAC 46. The selector 118 serves as a switchover circuit which, as symbolically represented by the control line 112, is controlled by the general controller 26 to select one of the three separated color video signals appearing at the output 36 of the picture processor 34 and delivers it to an output 37.

Connected to synchronizing signal input terminals of the CRT 42 and monitor 48 is the synchronizing signal output terminal 52 of the output synchronizer 50. The CRT 42 and monitor 48 constitute a picture output device adapted to visualize frame video signals.

The output synchronizer 50 includes a selfdriven reference oscillator, not shown, and functions to generate various kinds of clocks for controlling chiefly the recording system of the apparatus, e.g. synchronizing signals SYNC and pixel clock PCLK. These clocks are fed from an output 54 of the synchronizer 50 to the picture processor 34, shift register 102, and DACs 40 and 46. Further, the synchronizer 50 produces at an output 51 an increment clock for incrementing the address counter 94. As shown, the synchronizer 50 is controlled by the general controller 26 via a control line 29.

The positions of the switches 114 and 310, FIG. 3, are controlled by the general controller 26, as represented by the control line 112. Both of the switches 114 and 310 are actuated to the illustrated positions when video signals are to be fed to the monitor 48 by interlace scanning, and to opposite positions to the illustrated when video signals are to be fed to the CRT 42 by non-interlace scanning, i.e. sequential scanning.

The monitor 48 may advantageously be implemented with an ordinary color CRT display. The three color-separated video signal data read out of the frame memory 22 under the control of the general controller 26 are processed by the picture processor 34 and, then, fed to the monitor 48 by two-field one-frame interlace scanning. Advantageously, the signal rate may comprise an ordinary TV signal rate, e.g. 525 scanning lines and 1/60 seconds interlacing. A monitor which is compatible with such an ordinary color TV signal system is desirable from the construction and economy standpoint. Another advantage attainable with such a monitor is that it can display pictures in the same conditions as those which may be reproduced by a monitor that is readily accessible by an ordinary person.

The CRT 42 for recording pictures may advantageously be implemented with a black-and-white CRT. The three separated-color signals which have been processed by the picture processor 34 are supplied to the CRT 42 by sequential or non-interlace scanning. In this particular embodiment, the supply of video signals is effected by a 1,050 scanning lines, 1/15 seconds frame period non-interlace scanning system. If desired, however, the scanning line interpolator 108 may be omitted and, instead, the line 116 may be directly interconnected to the input 36 of the selector 118. In that case, a 525 scanning lines, 1/30 seconds frame period non-interlace scanning system may advantageously be used.

The period of time for producing the respective separated-color signals may be substantially one second per screen of one separated color, for example, although it depends upon the radiation characteristics of the CRT 42, photosensitivity of the recording medium 12, etc. The general controller 26 controls the picture recording operation such that, for example, a video signal representative of an R-color screen is read out of the frame memory 22 to be displayed for substantially one second on the CRT 42, then a G-color screen also for substantially one second, and then a B-color screen also for substantially one second.

So far as a picture displayed on a screen 56 of the CRT 42 is concerned, flicker and other difficulties from the visual sensation standpoint do not matter at all. Rather, the non-interlace scanning system which is least possible to cause paring of scanning lines is desirable from the viewpoint of making the effect of raster inconspicuous. In addition, the non-interlace scanning system is capable of readily performing vertical interpolation adapted for elimination of false colors and other various kinds of picture processing, as will be described.

The screen 56 of the CRT 42 is photographed through a lens 58 so that the frame picture appearing on the screen 56 is focused onto the photosensitive surface of the recording medium 12. Color filters 60 associated with the three separated colors, respectively, are located behind the lens 58 and positioned on the optical axis of the lens 58 one at a time. Selection of the filters 60 and the feed of the medium 12 are performed by a feed and filter control section 62 which is in turn controlled by the general controller 26 via a drive circuit, or driver, 64. These in combination constitute a hard copy producing apparatus adapted to visualize a frame picture and reproduce it on the medium 12 as a hard copy.

The general controller 26 collectively controls the operations of the whole apparatus and may advantageously be implemented with a microprocessor or like processing unit. Interconnected to the controller 26 are such an input unit as a keyboard which is manipulatable to enter commands into the apparatus, and the operation and display section 70 adapted to show an operator various internal conditions of the apparatus as well as commands.

Figure 7:
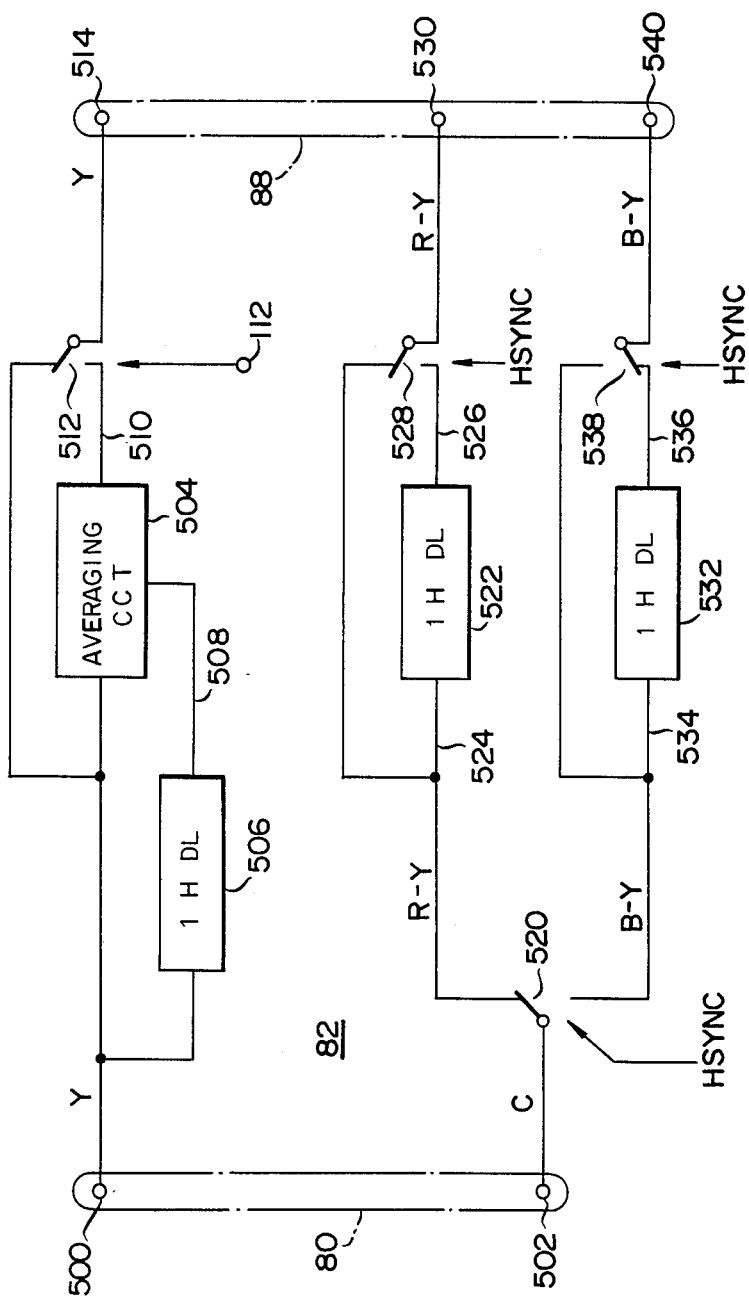
FIG. 7 is a block diagram showing a specific construction of an interpolating section shown in FIG. 2.

Referring to FIG. 7, a specific construction of the interpolator 82 is shown. Among the video data which are applied from the ADC 20 to the interpolator 82 over the line 80, the luminance signals Y are fed to a terminal 500 and the chroma signals C to a terminal 502. The terminal 500 is interconnected to an input of an averaging circuit 504 and that of a delay circuit (1HDL) 506. The output 508 of the delay circuit 506 is interconnected to the other input of the averaging circuit 504. The delay circuit 506 sequentially receives luminance signals at the input 500 and sequentially delivers them to the output 508 after delaying them one horizontal scanning period (1H).

The averaging circuit 504 functions to simply add and average the luminance signals sequentially applied thereto via the two inputs 500 and 508, on the basis of corresponding pixel positions. The output 510 of the circuit 504 is interconnected to a terminal 514 via a switch 512. The switch 512 is actuated by a control signal which is applied thereto from the general controller 26 over a control line 112. When the DPSK data signal associated with the disk 10 indicates that the disk 10 has stored frame video signals, the controller 26 delivers a control signal which actuates the switch 512 to the illustrated position. When the DPSK data is representative of field video signals, the controller 26 delivers a control signal which alternately actuates the switch 512 to the illustrated position and the opposite position timed to the vertical synchronizing signals VSYNC. The input 500 is interconnected to the output 514 via a terminal of the switch 512.

Applied to the terminal 502 are the chroma signals C. The terminal 502 is interconnected to an input 524 of a delay circuit 522 via a switch 520 which is responsive to the horizontal synchronizing signals HSYNC, which are supplied from the output 100 of the input synchronizer 30. The delay circuit 522 receives sequentially appearing chroma signals at the input 524 and sequentially produces them at an output 526 after delaying them 1H. The output 526 of the delay circuit 522 is interconnected to an output 530 via a switch 528 which is similar to the switch 520. The input 524 of the delay circuit 522 is further connected to the output 530 bypassing the delay circuit 522 via a terminal of the switch 528.

In a position opposite to the illustrated, the switch 520 connects the terminal 502 to an input 534 of a delay circuit 532. The delay circuit 532 sequentially receives chroma signals and sequentially produces them at an output 536 after delaying them by 1H. The output 536 of the circuit 532 is interconnected to an output 540 via a switch 538 which is similar to the switch 528. The input 534 of the circuit 532 is connected also to the output 540 bypassing the circuit 532 via a terminal of the switch 538. The output terminals 514, 530 and 540 of this circuitry are interconnected to the decoder 90.

The switch 520 alternately assumes the two positions timed to the horizontal synchronizing signals HSYNC which are routed from the input synchronizer 30 through the control line 100. In this particular embodiment, the chroma signals comprise R-Y and B-Y color-difference signals and line-sequentially arrive at the terminal 502. The position of the switch 520 is controlled such that the R-Y signal is routed toward the delay circuit 522 and the B-Y signal toward the delay circuit 532.

Each of the switches 528 and 538 alternately assumes the illustrated position and the opposite position in synchronism with the horizontal synchronizing signals HSYNC which are fed from the input synchronizer 30 over the control line 100.

In this embodiment, line-sequential chrominance signals associated with the same picture are repeatedly read out of the disk 10 over each field period. The general controller 26 reads the DPSK data out of the disk 10 through the disk reader 14 and, when identified that the video signals stored in the disk 10 are frame video signals, locks the switch 512 which is included in the interpolator 82 at the illustrated position.

In this condition, the luminance signals Y are delivered from the output 514 to the decoder 90 as they are over both of the first and second fields. Meanwhile, concerning the chroma signals C, because the switches 520, 528 and 538 each alternately assumes the illustrated position and the other position timed to the horizontal synchronizing signals HSYNC, the same color-difference signal R-Y appears at the output 530 two consecutive horizontal scanning lines at a time while the same color-difference signal B-Y appears at the output 540 two horizontal scanning lines at a time. As a result, the luminance signals are delivered to the input 88 of the decoder 90 as they are and the chrominance signals with line-sequential missing portions thereof interpolated.

Where the video signals stored in the disk 10 are field video signals, the general controller 26 causes the switch 512 of the interpolator 82 to alternately assume the opposite positions in synchronism with the vertical synchronizing signals VSYNC. Each of the switches 520, 528 and 538 is alternately brought to the opposite positions thereof timed to the horizontal synchronizing signals HSYNC. Consequently, missing portions of the luminance signals and chroma signals are interpolated by the interpolator 82 on a one horizontal scanning line basis over both of the first and second fields.

Figure 8A:
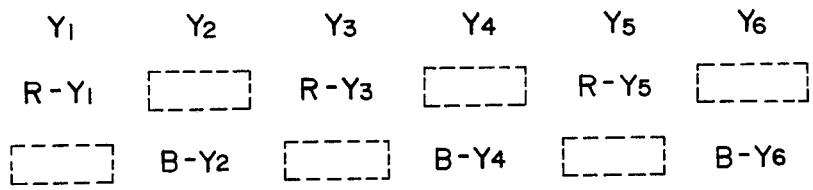
FIGS. 8A, 8B and 8C are views useful for understanding respectively manners of interpolation of original video signals, first field video signals and second field video signals with respect to the first to the sixth horizontal scanning lines in operation of the FIG. 2 embodiment.

In detail, as represented by the first to sixth horizontal scanning lines in FIG. 8A, the line-sequential chrominance video signals which arrive at the input 80 of the interpolator section 82 are missing as represented by dotted rectangles. In FIG. 8A, the numerals designate the numbers assigned to the horizontal scanning lines.

Figure 8B:
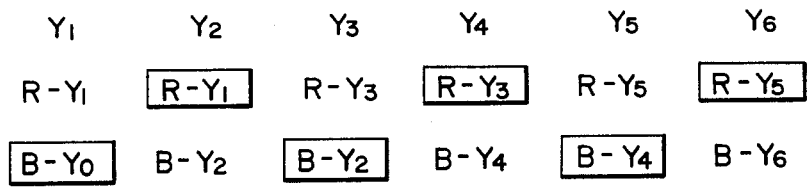
Figure 8C:
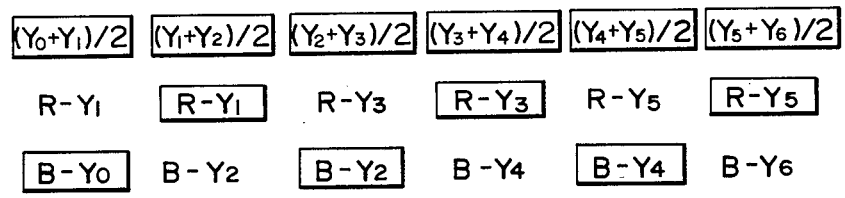

Concerning the luminance signals, the luminance signals Y appearing at the output 500 are directly used as those in the first field as shown in FIG. 8B. The luminance signals in the second field are produced by simply adding and averaging luminance signals associated with pixels on the "n−1" horizontal scanning line, signals Yn−1, and those associated with corresponding pixels on the "n" horizontal scanning line, signals Yn, each of the signals Yn−1 and Yn also arriving at the input 500. The resultant luminance signals in the second field are shown in FIG. 8C. In FIGS. 8B and 8C, solid rectangles represent those signals which have been interpolated.

As for the chroma signals, the same chrominance signals R-Y appear at the output 530 two horizontal scanning lines at a time while the same chrominance signals B-Y appear at the output 540 two horizontal scanning lines at a time, as has been the case with the previously discussed frame video signals. This is true with both of the first and second fields. The resultant luminance signals in the first field are shown in FIG. 8B and those in the second field in FIG. 8C, and they are identical with each other.

The video signals with missing portions thereof interpolated in the above-described manner are converted by the decoder 90 to three separated color signals and, then, stored in the memory 22.

As described above, in this particular embodiment, the same chroma signals are applied to each two consecutive scanning lines both in the first and second fields while luminance signals appearing at the output 400 are directly used for the first field and, for the second field, simply added and averaged with respect to corresponding pixels of each two consecutive scanning lines. The video signals, therefore, involve a minimum of color difference and allow edges of images to appear smoothly changing, achieving a relatively high degree of sharpness.

Should the chroma signals be averaged as the luminance signals, the color difference due to averaging would be aggravated to result in the need for a delay circuit and other circuit elements and, thereby, make the circuit arrangement complicated, because of the fact that chroma signals appear line-sequentially. In accordance with this embodiment, pictures with excellent quality can be recorded and displayed without encountering such noticeable color difference or resorting to an intricate circuitry.

The general controller 26 controls the frame memory 22, picture processor 34 and other various sections of the apparatus to read video signals out of the disk 10 and sequentially record them in the medium 12 in the form of a color picture. Specifically, a video signal stored in one track of the disk 10 is read out by the disk reader 14, then decoded, and then stored in any one of the frame memories 22A and 22B as three separated-color signals. In this instance, addresses in the memory locations of which the signals are to be written are fed to the memory 22A or 22B from the address counter 94 which is incremented by the increment clock produced by the input synchronizer 30. It follows that in the illustrative embodiment one field of video signals are sequentially written into the associated address locations of the frame memory 22A or 22B with missing portions thereof interpolated by the interpolator 82.

First, the disk is loaded in the disk reader 14 of the apparatus so that the video signals are read into the memory 22. In this instance, the selector 66 is so controlled by the general controller 26 as to route synchronizing signals from the input synchronizer to the address counter 94. For example, when the memory 22A has been loaded with one frame of video signals, the picture processor 34 reads them out in a predetermined sequence during the next frame period. Specifically, the video signals are outputted at the interlace scanning TV signal rate when the picture is to be displayed on the monitor 48 and by non-interlace scanning when it is to be applied to the CRT 42 for recording, each as three separated colors frame video signals. At this instant, the selector 66 is controlled by the controller 26 to pass the synchronizing signals from the output synchronizer 50 to the address counter 94.

To display a picture on the monitor 48, the controller 26 brings the switches 310 and 114 to the illustrated positions and conditions the address counter 94 to be incremented according to interlace scanning. In this condition, the address counter 94 is incremented in such a manner as to sequentially read video signal data which are stored in the memory 22A or 22B by interlace-scanning, in response to the increment clock which is fed from the output 51 of the output synchronizing section 50 via the switch circuit 66.

The above readout procedure is sequentially repeated on every other scanning line until two fields of video signals have been read out by interlace-scanning. As a result, at the output 33 of the frame memory 22, the first and second fields of video signals sequentially appear on an interlace basis. In this instance, the address counter 94 is set such that readout of the video signal on the first horizontal scanning line in the second field begins at the end of readout of a video signal on the last scanning line in the first field and at a particular pixel located at the 0.5H position.

The interlaced video signals are converted by the shift register 102 to serial signals which are then applied to the corrector 106. In response, the corrector 106 subjects the input video signals to color correction and tone correction in compliance with conditions currently set up, the corrected signals being fed via the switch 310 to the output 110. The signal from the output 110 is routed through the switch 114 to the DAC 46 to be converted to analog signals, so that the signals are visualized on the monitor 48.

In detail, the three separated-color (primary colors) signals are subjected to gamma compensation at the $-\gamma$ circuit 408 and then passed through the color conversion matrix 416 to the LOG circuit 424. Meanwhile, when the disk 10 has been loaded for the first time in the apparatus, the controller 26 controls the parameters of the matrix 416 to default values, here neutral values.

Data appearing at the outputs 418, 420 and 422 of the matrix 416 are logarithmically compressed by the LOG circuit 424 and, then, applied to the tone correctors 432, 434 and 436, respectively. The video signal data undergo color temperature compensation at the circuits 432, 434 and 436 in conformity to a particular color temperature distribution of the picture. The outputs of the circuits 432, 434 and 436 are delivered to the tone corrector 492.

The tone corrector 492 inverse-logarithmically converts the input video signal data referencing the lookup table based on the input data, thereby subjecting the input data to gamma compensation. The video signals compensated in this manner are visualized on the monitor 48 via the output 38 and DAC 46.

The operator, while watching the monitor 48, determines a kind of a color separating filter included in the electronic still camera which was used for picking up the picture. This decision will be done easily while looking at a picture being displayed on the monitor 48 by a person of ordinary skill in the color printing art. The kind of a filter determined so determined is entered into the apparatus through the operation and display section 70.

Based on the filter information entered, the general controller 26 selects one of the groups of color conversion coefficients which are stored in the store 80. Specifically, a group of conversion coefficients which match with the particular kind of the filter are selected out of the matrix 416. An arrangement may be made such that simultaneously with or separately from the selection of conversion coefficient group as stated above picture processing commands for adjusting picture processing control parameters such as density, tone, color balance and white balance are entered for each one of pictures which may be reproduced on the monitor 48.

In this particular embodiment, a kind of a filter used is entered through the operating section 70. Another possible construction is such that information which designates a particular color conversion coefficient group is entered through the section 70 while the controller 26 reads the designated coefficient group out of the store 80 as designated by the input information. Further, in the case where the disk 10 is of the kind having stored the kind of a filter beforehand as data, there may be adopted a construction wherein such filter data is read out of the disk 10 while the controller 26 selects a particular color conversion coefficient group out of the store 80 referencing the filter data.

The above-described commands are decoded by the controller 26 and then fed to the picture processor 34 via the control line 68, whereby particular adjustment parameters are selected. For example, a group of color conversion coefficients selected are fed to the matrix 416 via a control data line 68a. In response, the matrix 416 compensates the video signal data arrived at the inputs 410, 412 and 414 using the coefficients. As a result, video signals which are free from the influence of difference in reproducibility derived from a color filter of a camera are produced from the matrix 416.

The video signal data undergone such picture processing are reproduced on the monitor 48 via the previously stated path. The operator is thus allowed to see if the group of coefficients selected are adequate.

A command for causing the data to be recorded in the medium 12 is entered through the operation and display section 70. To output a picture to the CRT 42, the controller 26 actuates the switches 310 and 114 to the opposite positions to the illustrated. At the same time, the controller 26 conditions the address counter 94 such that the latter is incremented by sequential scanning, i.e., non-interlace scanning with regard to the addresses of the memory 22 where video signal data are stored.

The address counter 94 is therefore incremented in such a manner as to read the video signal data out of the memory 22A or 22B, which is not writing then, by sequential or non-interlace scanning. Again, the increment clock is fed from the output synchronizer 50.

Such readout is sequentially repeated on the consecutive scanning lines until two fields of video signals have been read out as one frame by non-interlace scanning. Consequently, one frame of video signals appear at the output 33 of the frame memory 22 by non-interlace scanning.

The video signals are converted by the shift register 102 to serial signals which are then applied to the corrector 106. In response, the corrector 106 subjects the input video signals to color correction and tone correction, and N/P conversion which is effected by the N/P converter 304 as well as tone correction associated with the N/P conversion.

The output signal data from the tone correctors 432, 434 and 436 are applied to the matrix 452, too. In this particular embodiment, the matrix 452 performs picture processing such as compensating for improper absorption associated with a coloring matter of the medium 12 in response to a correction command which may be entered through the section 70.

Then, the tone correctors 460, 462 and 464 reference the lookup tables thereof so as to inverse-logarithmically convert the processed video signals, thereby subjecting them to gamma compensation and N/P conversion as well as compensation for the influence of the medium 12 on the characteristics.

The video signals compensated as described above are fed out to the output 110 via the switch 310 and further to the scanning line interpolator 108 via the switch 114. In this particular embodiment, the interpolator 108 doubles the number of scanning lines as previously mentioned so that non-interlace video signals are provided with 1,050 scanning lines and a frame period of 1/15 second.

Referring to FIG. 4, the switch 324 alternates its positions in response to the horizontal scanning signals HSYNC which are fed thereto from the output synchronizer 50. Hence, for a certain 1H period a 1H of video signals which have appeared at the input 116 are directly applied to the output 36 of the interpolator and, for the next 1H, a simple mean of video signals which have appeared at the input 116 during the immediately preceding 1H period and then delayed 1H by the delay circuit 322 and video signals which have appeared at the input 116 during the current 1H period. This procedure is repeated to double the number of horizontal scanning lines.

In this manner, non-interlaced video signals with a doubled number of scanning lines are delivered from the output 36 of the interpolator 108 to the selector 118. At this instant, the general controller 26 conditions the selector 118 in such a manner as to select one of the separated-color video signals, e.g. R video signal. Then, among the video signals outputted by the picture processor 34, only the R video signal will be applied via the DAC 40 to the CRT 42 to be displayed on the screen 56.

In the above instance, the general controller 26 has already controlled the feed and filter controller 62 to feed the medium 12 and position a fresh photosensitive surface of the medium 12 in a predetermined exposure station. Also, the controller 26 has brought one of the filters 60 to the optical axis of the lens 58. Naturally, a particular filter which matches with the separated color video signal to be fed to the CRT 42 is selected. As a result, images in one separated color are recorded as latent images in the photosensitive surface of the medium 12.

The controller 26 repeats the above-stated sequence of events without feeding the medium 12, while causing the selector 118 to select the other colors one after another. This allows the video signals in the other two colors to be delivered to the CRT 42 with the result that their associated images are photographed and recorded in the same frame of the medium 12 as the images in the first color. When the medium 12 is developed afterwards, in the case of the exemplary screen 200 as shown in FIG. 5, a color hard copy of one frame picture 210 as shown in FIG. 6 will be produced. Sequential scanning as discussed above is successful to record a picture which has undergone desirable effects of making raster inconspicuous and is free from the possibility of scanning lines being paired.

Where an alternative construction which lacks the scanning line interpolator 108 as permissible in accordance with the present invention is chosen, the number of scanning lines is not increased as shown in FIG. 7. That is, in this particular embodiment, a non-interlaced picture is reproduced with 525 scanning lines and a frame period of 1/30 second.

It will be seen from the above that in this embodiment when video signals are read out of the frame memory 22 to be applied to the output device 42 for recording, they may be applied to the monitor 48 as well. Hence, the operator is allowed to determine the kind of a filter of an electronic still camera used to pick up the picture and select a particular group of color conversion coefficients which match with the kind of the filter, while looking at the picture being displayed on the monitor 48.

Since pictures stored in one magnetic disk are usually those which were picked up by the same camera, a suitable group of color conversion coefficients may be selected when a new disk 10 is loaded in the apparatus for the first time. As previously stated, an operator selects a particular coefficient group while watching the monitor 48 and, therefore, he or she is capable of choosing an optimum coefficient group. Such optimum selection is insured even if information on a color separating filter is not stored in the disk 10.

In the embodiment shown and described, groups of compensation coefficients are stored in the store 81 beforehand. Alternatively, an arrangement may be made such that when information representative of a kind of a filter is entered through the section 70, the general controller 26 computes a particular group of coefficients which match with the filter and deliver the computed data to the picture processor 34.

In addition to the compensation by color conversion as discussed above, other various kinds of compensation such as picture-by-picture white balance correction may be effected through the section 70. Video signals adequately compensated by the above procedure are fed to the output device 42 and thereby turned into a hard copy.

The apparatus in accordance with the present invention is effectively applicable not only to a picture recording system which is implemented with a CRT as shown and described but also to a laser recording system, a liquid crystal recording system, a thermal recording system, an ink jet recording system, an electrophotographic system, and other various kinds of recording systems.

It will be seen from the foregoing that in accordance with the present invention one is capable of selecting a particular group of color conversion coefficients which match with a kind of a color separating filter which was used to pick up a picture while looking at the picture being displayed on a monitor. Hence, compensation or color conversion which well conforms to a kind of a color filter is effected so that a picture reproduced appears as natural as an actual scene and may be produced as a hard copy, or print. Thus, a hard copy of a picture is achievable with excellent quality.

While the present invention has been described with reference to the particular illustrative embodiment, it is not to be restricted by that embodiment but only by the appended claims. It is to be appreciated that those skilled in the art can change or modify the embodiment without departing from the scope and spirit of the present invention.

What is claimed is:

1. An apparatus for producing a hard copy of a picture, comprising:
   first input means for receiving a video signal representing a picture which was pickup by a color image pickup device;
   second input means for receiving data representing picture processing conditions according to which the video signal is to be processed, the data representing picture processing conditions including information relating to the kind of a color separating filter associated with the color image pickup device;
   picture processing means for processing the video signal according to the data received by said second input means;
   store means for storing a plurality of groups of color conversion coefficients, wherein each of said groups of color conversion coefficients is associated with a different kind of color separating filter usable with a color image pickup device;
   picture recording means for recording on a recording medium the picture which is represented by the video signal processed by said picture processing means; and
   picture display means for displaying the picture which is represented by the video signal processed by said picture processing means;
   said picture processing means being operative in response to the information included in the data received by said second input means to read a particular one of the groups of color coefficients which is associated with the kind of color separating filter associated with said color image pickup device out of said store means, and for subjecting the video signal to color correction according to the group of color conversion coefficients read out of said store means.

2. An apparatus in accordance with claim 1, wherein said first input means comprises magnetic disk reader means for reading the video signal out of a magnetic disk on which the video signal is stored.

3. An apparatus in accordance with claim 2, wherein the color image pickup device comprises a color electronic still camera, the video signal stored on the magnetic disk having been formed by said camera.

4. An apparatus in accordance with claim 1, wherein said first input means receives a standard television signal as the video signal.

5. An apparatus in accordance with claim 1, wherein said second input means receives data generated by keyboard means for manually entering the information relating to the kind of a color separating filter associated with said color image pickup device.

* * * * *